(12) United States Patent
Ray

(10) Patent No.: US 10,277,269 B2
(45) Date of Patent: Apr. 30, 2019

(54) PHASED ARRAY BEAM TRACKING USING BEAM GAIN CODING

(71) Applicant: The Boeing Company, Chicago, IL (US)

(72) Inventor: Gary A Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/374,448

(22) Filed: Dec. 9, 2016

(65) Prior Publication Data
US 2018/0167102 A1 Jun. 14, 2018

(51) Int. Cl.
| | | |
|---|---|---|
| G01S 3/04 | (2006.01) |
| G01S 3/14 | (2006.01) |
| H04B 7/06 | (2006.01) |
| H04B 17/14 | (2015.01) |
| H04B 7/185 | (2006.01) |
| H04B 1/7113 | (2011.01) |
| H04B 7/0417 | (2017.01) |

(52) U.S. Cl.
CPC .............. *H04B 1/7113* (2013.01); *G01S 3/04* (2013.01); *G01S 3/14* (2013.01); *H04B 7/0417* (2013.01); *H04B 7/0617* (2013.01); *H04B 7/18502* (2013.01); *H04B 17/14* (2015.01); *H04B 2201/709718* (2013.01)

(58) Field of Classification Search
CPC .. H04B 1/7113; H04B 17/14; H04B 7/18502; H04B 7/086; H04B 7/0417; H04B 7/043; H04B 7/0408; H04B 7/0634; H04B 17/318; H04B 7/0452; H04B 7/0639; H04B 7/088; H04B 1/707; H04B 1/71052; H04B 2201/709718; H04B 7/0617
See application file for complete search history.

(56) References Cited

U.S. PATENT DOCUMENTS

| 5,874,915 A * | 2/1999 | Lee ..................... H01Q 3/242 |
| | | 342/372 |
| 6,593,882 B1 * | 7/2003 | Kim ..................... H04B 7/086 |
| | | 342/373 |
| 6,694,154 B1 * | 2/2004 | Molnar .............. H04B 7/18532 |
| | | 455/277.1 |

(Continued)

OTHER PUBLICATIONS

P. Chen, "An improved beam tracking method for phased array in mobile satellite reception," 2012 International Conference on Microwave and Millimeter Wave Technology (ICMMT), Shenzhen, 2012, pp. 1-3.*
Chu, David C.; "Polyphase Codes With Good Periodic Correlation Properties," IEEE Transactions on Information Theory, 1972, pp. 531-532.
Frank, Robert L.; "Polyphase Codes with Good Nonperiodic Correlation Properties," IEEE Transactions on Information Theory, 1963, pp. 43-45.

(Continued)

*Primary Examiner* — Sam K Ahn
*Assistant Examiner* — Amneet Singh
(74) *Attorney, Agent, or Firm* — Sage Patent Group

(57) ABSTRACT

A system for phased array signal beam tracking includes a phased array transmitter configurable for transmitting a signal beam at a selected transmit beam angle from a plurality of different transmit beam angles. The system also includes a beam gain angle coding assembly configured for modulation of a gain of the signal beam to produce a resulting gain profile of the signal beam. The resulting gain profile includes offset angle coding that indicates an offset incident angle of the signal beam at a receiving antenna.

20 Claims, 6 Drawing Sheets

(56) References Cited

U.S. PATENT DOCUMENTS

| | | | |
|---|---|---|---|
| 2004/0121810 A1* | 6/2004 | Goransson | H04B 7/0408 455/562.1 |
| 2009/0153394 A1* | 6/2009 | Navarro | G01S 7/4017 342/174 |
| 2009/0296860 A1* | 12/2009 | Chester | G06F 17/15 375/340 |
| 2012/0177011 A1* | 7/2012 | Xi | H04B 7/0404 370/335 |
| 2015/0009968 A1* | 1/2015 | Yu | H04L 5/0053 370/336 |
| 2016/0212669 A1 | 7/2016 | Davis | |
| 2017/0026962 A1* | 1/2017 | Liu | H04W 72/0446 |
| 2018/0006702 A1* | 1/2018 | Doostnejad | H04B 7/0639 |

OTHER PUBLICATIONS

Cheng, Xiu-Zhi, et al.; "Tracking Positioning Algorithm for Direction of Arrival Based on Direction Lock Loop," Future Internet, 2015, pp. 214-224, vol. 7.

Gold, Robert; "Optimal Binary Sequences for Spread Spectrum Multiplexing," IEEE Transactions on Information Theory, 1967, pp. 619-621.

Kasami, Tadao; Weight Distribution Formula for Some Class of Cyclic Codes, Coordinated Science Laboratory, University of Illinois, 1966, 29 Pages, Report R-285.

European Patent Office; Extended European Search Report for European Patent Application No. 17192353.5 dated Apr. 18, 2018, 10 Pages.

* cited by examiner

PHASED ARRAY BEAM TRACKING USING BEAM GAIN CODING

FIELD

The present disclosure relates to communications, tracking signal beams and more particularly to phased array beam tracking using beam gain coding.

BACKGROUND

Phased array antennas are used for both transmitting and receiving radio frequency (RF) communications signals. Phased array antennas can transmit to conventional-antenna-based receivers, or vice versa. When a phased array antenna is used for both ends of the communication link, both the transmitter and receiver create a beam with a gain in the proper direction (pointing at each other) and then modifying that direction (steering the beam) as the transmitter and/or receiver moves or changes direction. This changing direction or moving can be the result of transmitter and/or receiver platform motion or vibration, atmospheric effects, multi-path effects or other movement. A similar situation exists when the phased array antenna is used only for transmission, except that steering of the receiver antenna may in fact be done mechanically, or the antenna may not be steered at all if the antenna is a fixed antenna. In this latter case, all beam steering would be done by the phased array antenna associated with the transmitter. A typical example would be an aircraft with a phased array antenna that is transmitting to or receiving a transmission from a satellite and must track the satellite through all of the maneuvers of the aircraft. Or it could be two helicopters communicating with each other as they both fly on their separate paths, each with its own phased array antenna.

The standard method for a receiver to track a transmitted signal to the receiver to improve the communications performance uses the signal power and tries to continuously maximize that signal power by steering the phased array receive beam or by mechanically steering the antenna. A disadvantage of current power-based receiver tracking methods is that with only one signal power measurement available at a time, any loss or gain could indicate that the beam's direction must be corrected. However, no indication is available concerning which direction the beam should be steered. Thus typical beam steering algorithms must steer off in other directions in order to sample the signal power in those directions in order to update the steering vector and hence the beam direction. Typically, these algorithms would essentially track the signal at a lower average signal power than is available with a correctly pointed beam. For example, the tracking might occur at the 3 decibel (dB) level (one half power) by tracking two, three or four points around the actual maximum power direction at the 3 dB level. This in turn produces a "pointing loss" and "gain ripple". These ripples are on top of the normal signal power ripple caused by propagation, scintillation and multi-path effects which are not caused by beam pointing inaccuracy. The gain loss and ripples directly affect the signal quality and must be taken into consideration in any system. Accordingly, there is a need for beam tracking or steering that is not subject to these disadvantages.

SUMMARY

In accordance with an embodiment, a system for phased array signal beam tracking includes a phased array transmitter configurable for transmitting a signal beam at a selected transmit beam angle from a plurality of different transmit beam angles. The system also includes a beam gain angle coding assembly configured for modulation of a gain of the signal beam to produce a resulting gain profile or waveform of the signal beam. The resulting gain profile includes offset angle coding that indicates an offset incident angle of the signal beam at a receiving antenna.

In accordance with another embodiment, a system for phased array signal beam tracking includes a phased array transmitter onboard a first vehicle. The phased array transmitter is configurable for transmitting a signal beam at a selected transmit beam angle from a plurality of different transmit beam angles. The system also includes a beam gain angle coding assembly configured for modulation of a gain of the signal beam to produce a resulting gain profile or waveform of the signal beam. The resulting gain profile includes offset angle coding that indicates an offset incident angle of the signal beam at a receiving antenna. The system also includes a first receiver onboard a second vehicle. The first receiver receives the signal beam at an actual angle of incidence. The system additionally includes a correlator to cross-correlate the resulting gain profile or waveform of the received signal beam against a plurality of angle coded waveforms to determine an offset incident angle of the received signal beam. Each angle coded waveform corresponds to a respective one of a plurality of different offset incident angles of an incident signal beam. The offset incident angle of the received signal beam corresponds to an angle coded waveform of the plurality of angle coded waveforms with a highest correlation to the waveform of the received signal beam.

In accordance with a further embodiment, a method for phased array beam tracking includes modulating a gain of signal beam to produce a resulting gain profile or waveform of the signal beam. The resulting gain profile includes offset angle coding that indicates an offset incident angle of the signal beam at a receiving antenna. The method also includes transmitting the signal beam by a phased array transmitter and receiving the signal beam by a first receiver. The method also includes cross-correlating the resulting gain profile or waveform of the received signal beam against a plurality of angle coded waveforms. Each angle coded waveform corresponds to a respective one of a plurality of different offset incident angles of an incident signal beam. The offset incident angle of the received signal beam corresponds to an angle coded waveform of the plurality of angle coded waveforms with a highest correlation to the waveform of the received signal beam.

In accordance with another embodiment or any of the previous embodiments, the system includes a receiver to receive the signal beam and a correlator to cross-correlate the resulting gain profile or waveform of the received signal beam against a plurality of angle coded waveforms to determine an offset incident angle of the received signal beam. Each angle coded waveform corresponds to a respective one of a plurality of different offset incident angles of an incident signal beam. The offset incident angle of the received signal beam corresponds to an angle coded waveform of the plurality of angle coded waveforms with a highest correlation to the waveform of the received signal beam.

In accordance with another embodiment or any of the previous embodiments, the system includes a module configured to determine an angle error. The angle error is a difference between an actual angle of incidence of the received signal beam and the offset incident angle of the received signal beam. The system additionally includes a transmitter to transmit the angle error to a second receiver associated with the phased array transmitter. The angle error being used to steer the phased array transmitter.

In accordance with another embodiment or any of the previous embodiments, the angle error is added to information that is being sent by the transmitter to the second receiver.

In accordance with another embodiment or any of the previous embodiments, the system additionally includes a beam tracking device configured to determine a pointing error of the phased array transmitter from the angle error. The pointing error is used to steer the selected transmit beam angle of the phased array transmitter for tracking the first receiver.

In accordance with another embodiment or any of the previous embodiments, the system included a radio frequency (RF) source and the phased array transmitter includes a power divider that receives an RF signal from the RF source. The phased array transmitter also includes a plurality of transmitter signal paths and a plurality of antenna elements. Each transmitter signal path communicatively couples the power divider to an associated antenna element of the plurality of antenna elements. Each transmitter signal path is configurable for transmitting the signal beam from the plurality of antenna elements in the selected transmit beam angle of the plurality of different transmit beam angles.

In accordance with another embodiment and any of the previous embodiments, the beam gain angle coding assembly includes a beam gain angle coding module and a beam gain adjustable attenuator in each transmitter signal path of the plurality of transmitter signal paths. The beam gain angle coding module is electrically connected to the beam gain adjustable attenuator in each transmitter signal path for modulating the gain of an RF signal portion in each transmitter signal path to produce the resulting gain profile of the signal beam.

In accordance with another embodiment or any of the previous embodiments, the system further includes a beam amplitude control module and a beam phase control module. Each transmitter signal path includes a beam amplitude adjustable attenuator. The beam amplitude control module is electrically connected to the beam amplitude adjustable attenuator in each transmitter signal path. Each transmitter signal path also includes an adjustable phase shifter. The beam phase control module is electrically connected to the adjustable phase shifter in each transmitter signal path. The beam amplitude control module controls an amplitude of an RF signal portion in each transmitter signal path and the beam phase control module controls a phase of the RF signal portion in each transmitter signal path for transmitting the signal beam from the plurality of antenna elements at the selected transmit beam angle.

In accordance with another embodiment or any of the previous embodiments, the beam gain angle coding module is incorporated into the beam amplitude control module for modulating the gain of the RF signal portion in each transmitter signal path to produce the resulting gain profile of the signal beam.

In accordance with another embodiment or any of the previous embodiments, the offset angle coding uses direct sequence spread spectrum (DSSS) type coding or a code division multiple access (CDMA) type coding.

In accordance with another embodiment or any of the previous embodiments, the offset incident angle of the signal beam is determined in relationship to a bore sight of the receiving antenna or a line normal to a ground plane of the receiving antenna.

The features, functions, and advantages that have been discussed can be achieved independently in various embodiments or may be combined in yet other embodiments further details of which can be seen with reference to the following description and drawings.

DETAILED DESCRIPTION

Figure 1:
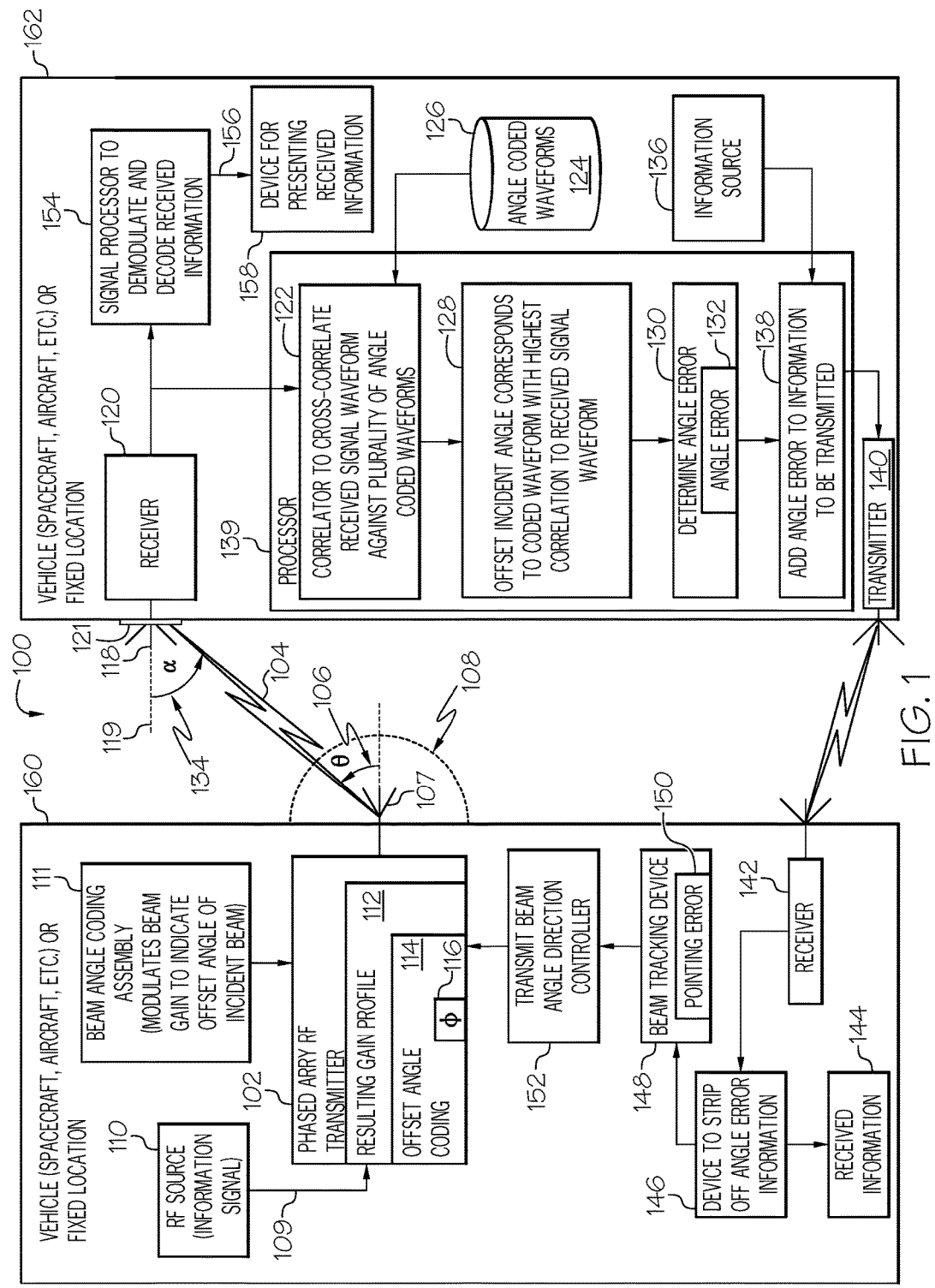
FIG. 1 is a block schematic diagram of an example of a system for phased array beam tracking using beam gain coding in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is a block schematic diagram of an example of a system 100 for phased array beam tracking using beam gain coding in accordance with an embodiment of the present disclosure. The system 100 includes a phased array transmitter 102 configurable for transmitting a signal beam 104 at a selected transmit beam angle 106 from a plurality of different transmit beam angles 108 represented by the semicircular broken line surrounding an antenna array 107 of the phased array transmitter 102 in FIG. 1. The phased array transmitter 102 is a phased array radio frequency (RF) transmitter for transmitting RF signals via the signal beam 104. The phased array transmitter 102 receives information signals or RF signals 109 containing information or content from an RF source 110 which are transmitted by the phased array transmitter 102 using the antenna array 107. An example of a phased array RF transmitter 200 useable for the phased array transmitter 102 will be described in more detail with reference to FIG. 2. Another example of a phased array RF transmitter 300 useable for the phased array transmitter 102 will be described in more detail with reference to FIG. 3.

The system 100 also includes a beam gain angle coding assembly 111 configured for modulation of a gain of the signal beam 104 to produce a resulting gain profile 112 of the signal beam 104. The resulting gain profile 112 of the signal beam 104 includes offset angle coding 114 that indicates an offset incident angle 116 of the signal beam 104 at a receiving antenna 118. Accordingly, the resulting gain profile 112 of the signal beam 104 is coded by providing a time and angle varying fine texture to the signal beam shape or waveform. The resulting gain profile 112 is below a noise level of a received signal to encode a main beam profile with beam offset angle information. The offset incident angle 116 of the signal beam 104 is determined in relationship to a bore sight 119 of the receiving antenna 118 or a line normal to a ground plane 121 of the receiving antenna 118.

Examples of coding used for the offset angle coding include but is not necessarily limited to direct sequence spread spectrum (DSSS) type coding, code division multiple access (CDMA) type coding or any other applicable coding for coding the gain profile 112 of a transmitted signal beam 104 with information that indicates an offset incident angle 116 of the signal beam 104 at a receiver or receiver antenna. As described in more detail herein, the resulting gain profile 112 of the signal beam 104 defines a particularly shaped waveform or angle coded waveform of the signal beam 104. Accordingly, different gain profiles 112 or different shaped waveforms or angle coded waveforms of the signal beam 104 indicate or correspond to different offset incident angles 116 of the signal beam 104 at the receiving antenna 118.

The system 100 also includes a first receiver 120 to receive the received signal beam 104 and a correlator 122. The correlator 122 is configured to cross-correlate the resulting gain profile 112 or angle coded waveform of the received signal beam 104 against a plurality of angle coded waveforms 124 to determine an offset incident angle 128 of the received signal beam 104. The angle coded waveforms 124 may be stored on a database 126. Each angle coded waveform 124 corresponds to a respective one of a plurality of different offset incident angles 116 of an incident signal beam to the receiving antenna 118. The offset incident angle 128 of the received signal beam 104 corresponds to an angle coded waveform of the plurality of angle coded waveforms 124 with a highest correlation to the waveform (resulting gain profile 112) of the received signal beam 104.

The resulting gain profile 112 or angle coded waveform of the received signal beam 104 is cross-correlated against the plurality of stored angle coded waveforms 124 by comparing the resulting gain profile 112 or angle coded waveform to each of the plurality of stored angle coded waveforms 124 in the database 126 to find one that most closely matches or correlates to the resulting gain profile 112 (or angle coded waveform) of the received signal beam 104. The cross-correlation between the angle coded waveforms 124 and the received signal beam 104 in discrete form is the inner product of the two sequences computed for all the possible delays between the angle coded waveforms 124 and the received signal beam 104. The angle error 132 corresponding to the maximum cross-correlation value across all the possible angle coded waveforms 124 or angle coded waveform sequences corresponds to an estimate of how much error is in the beam pointing at the receiver 120. Note that the cross-correlation can be done in a straight forward sum of products, or can be computed using Fourier transforms, depending on which can be computed most efficiently. In accordance with an embodiment, to make each maximum cross-correlation value more accurate, interpolation is used in the cross-correlation computation. The interpolation can be done in different ways. Examples of interpolation include but are limited to upsampling each signal before computation of the cross-correlation and interpolating the cross-correlation peak using a quadratic peak model.

In accordance with an embodiment, the receiving antenna 118 and first receiver 120 define a phased array receiver. An example of a phased array receiver 400 will be described in more detail with reference to FIG. 4. However, in other embodiments the receiving antenna 118 is a type of antenna or antenna system other than a phased array antenna and the first receive 120 is a type receiver other than phased array receiver. The system and method described herein is independent of the type of receiver or receiving antenna.

The system 100 also includes a module 130 configured to determine an angle error 132. The angle error 132 is a difference between an actual angle of incidence 134 of the received signal beam 104 at the receiving antenna 118 and the offset incident angle 128 of the received signal beam 104 determined from the resulting gain profile 112 or angle coded waveform of the received signal beam 104. In accordance with an embodiment, the angle error 132 is added to information from an information source 136 that is to be transmitted. A module 138 is configured to receive the information from the information source and to add the angle error 132 the information for transmission.

In accordance with an exemplary embodiment, the correlator 122, module 130 to determine angle error 132, and module 138 to add the angle error to information from the information source 136 are embodied on a processor 139 or processor device.

A transmitter 140 transmits the angle error 132 or angle error information to a second receiver 142 associated with the phased array transmitter 102. Or in another embodiment, the angle error 132 or angle error information is added to the information from the information source 136 and transmitted by the transmitter 140 to the second receiver 142. The angle error 132 or angle error information is used to steer the phased array transmitter 102. The angle error 132 is stripped off or removed from the received information 144 in a device 146 configured to strip off the angle error 132 from the received information 144. In general, this stripping out of the angle error 132 is accomplished through any reasonable standardized communications protocol that inserts the angle error 132 digital information in a known location within a message that is transmitted from the transmitter 140 to the second receiver 142.

The angle error 132 or angle error information is received by a beam tracking device 148 or beam tracking algorithm. The beam tracking device 148 is configured to determine a pointing error 150 of the phased array transmitter 102 from the angle error 132. The pointing error 150 is used to steer the selected transmit beam angle 106 of the phased array transmitter 102 for tracking the first receiver 120. In accordance with an exemplary embodiment, the beam tracking device 148 includes any standard angle tracking algorithm based on a phased loop tracking algorithm. An example of a phased loop tracking algorithm is described in "Tracking Positioning Algorithm for Direction of Arrival Based on Direction Lock Loop" by Xiu-Zhi Cheng, Da Rong Zhu, Shen Zhang and Ping He, pages 214-224, Future Internet 2015, 7(3) which is incorporated herein by reference.

The pointing error 150 is received by a transmit beam angle direction controller 152. The transmit beam angle direction controller 152 adjusts or modifies the phase and amplitude of a plurality of antenna elements 208 (FIG. 2) to control selection of the transmit beam angle 106 to track the first receiver 120.

A signal processor 154 also receives the received signal beam 104 from the first receiver 120. The signal processor 154 demodulates and decodes the received signal beam 104 to extract the received information 156 carried by the received signal beam 104. A device 158 presents the received information 156. The device 158 may include a speaker and/or a display for audio, visual or both audio and visual presentation of the received information 156.

In accordance with an embodiment, the phased array transmitter 102 and associated elements are onboard a first vehicle 160 and the first receiver 120 and associated elements are onboard a second vehicle 162 as illustrated in the exemplary embodiment in FIG. 1. The first and second vehicles 160 and 162 move relative to one another or any one of the vehicles may be stationary at any given time. Examples of the first vehicle 160 and/or the second vehicle 162 include but are not necessarily limited to a spacecraft, such as a satellite, an aircraft, terrestrial vehicle, watercraft, or other vehicle. In accordance with another embodiment, either one of the phased array transmitter 102 and associated elements as shown in the exemplary embodiment in FIG. 1 or the first receiver 120 and associated elements in FIG. 1 are located at a fixed geographic location rather than being onboard a vehicle while the other of the phased array transmitter 102 or first receiver 120 and respective associated elements are onboard a vehicle that is moving.

In accordance with an embodiment, the gain profile 112 is encoded with the offset angle information below a noise level of a received signal to eliminate gain loss and ripples inherent in previous systems and methods of tracking signal beams that involved steering a phased array off in other directions to sample the signal power in those directions to update the steering vector and hence beam direction of the phased array transmitter. The below noise modulation of the gain profile 112 with offset angle coding 114 communicates to the first receiver 120 where the incident signal beam is actually pointing. This allows the receiver 120 to send angle error 132 information back to the phased array transmitter 102 so that the phased array transmitter 102 can adjust its beam pointing as described above. Precisely correct beam pointing directions can be designed using the beam angle coding described herein that is available at an update rate that matches the dynamics of the phased array transmitter 102/receiver 120 pair. The dynamics of the phased array transmitter 102/receiver 120 pair refers to any movement between the transmitted beam direction from the phased array transmitter 120 and receiver beam direction from the first receiver 120. This movement could be caused by any number of things, ranging from motion and rotation of either platform associated with the phased array transmitter 102 or the first receiver 120. It could also mean any antenna motion (intended or not) that causes an apparent motion.

The system 100 also allows trade-offs between beam pointing and beam ripple reduction and phased array modulation/cross-correlation complexity. For example, by enabling beam pointing error detection as described herein, reduction of beam tracking ripple can be done. This tradeoff can be done in more than one way. For example, the number of antenna elements (208 in FIG. 2) can be increased and a dense set of angle codings or angle coded waveforms 124 can be provided (and therefore many correlations in the receiver must be done) so that the ripple can be reduced to almost nothing. Or the number of antenna elements may be increased slightly and have only a few angle codings so that fewer correlations are required and the ripple is reduced less than the previous approach.

Figure 2:
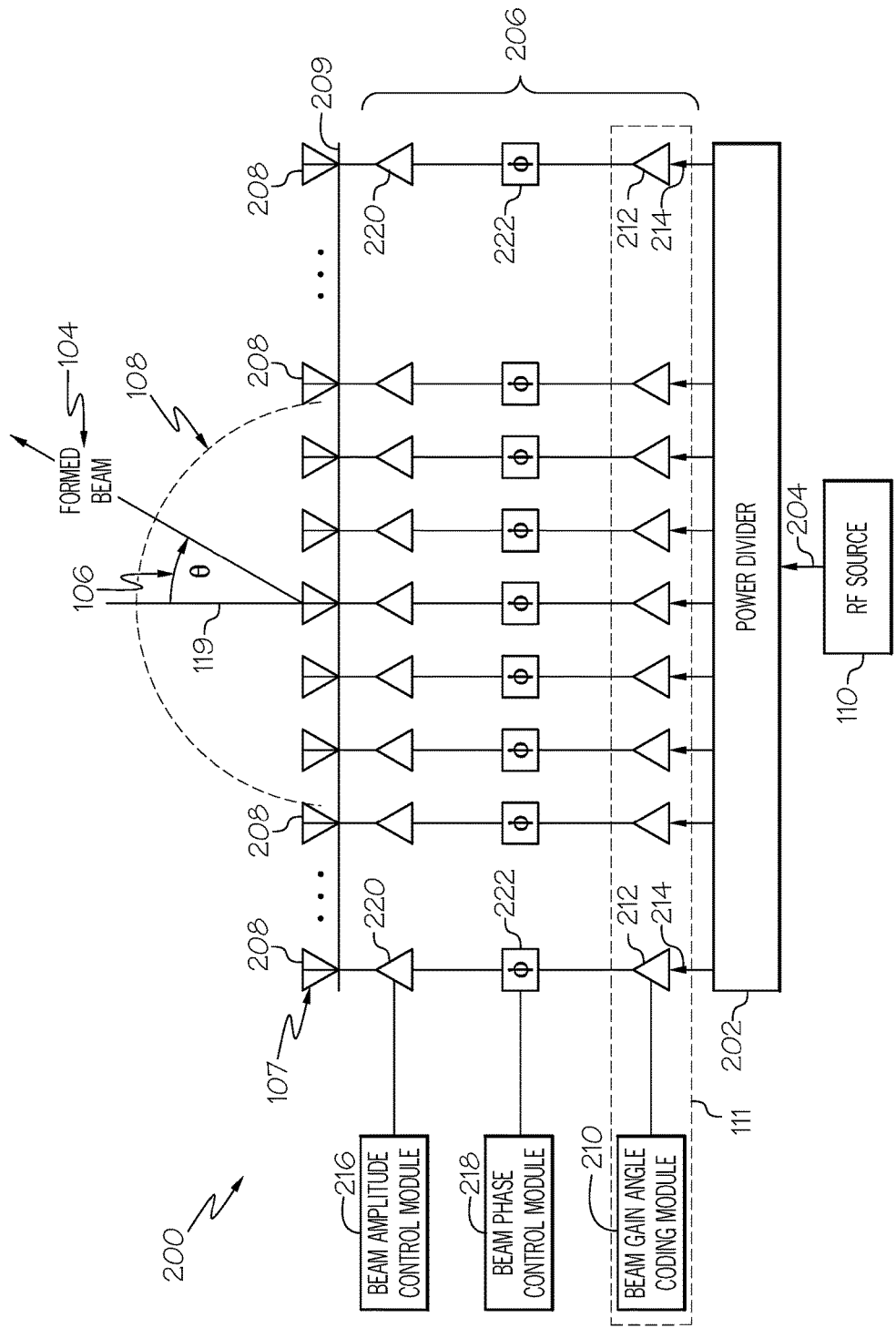
FIG. 2 is a block schematic diagram of an example of phased array transmitter for phased array beam tracking using beam gain coding in accordance with an embodiment of the present disclosure.

Referring also to FIG. 2, FIG. 2 is a block schematic diagram of an example of phased array RF transmitter 200 for phased array beam tracking using beam gain coding in accordance with an embodiment of the present disclosure. In accordance with an exemplary embodiment, the phased array RF transmitter 200 is used for the phased array transmitter 102 in FIG. 1. The phased array RF transmitter 200 includes a power divider 202 that receives an RF signal 204 containing information from the RF source 110. The phased array RF transmitter 200 also includes a plurality of transmitter signal paths 206 and a plurality of antenna elements 208. Each transmitter signal path 206 communicatively couples the power divider 202 to an associated antenna element 208 of the plurality of antenna elements 208. Each transmitter signal path 206 is configurable for transmitting the signal beam 104 from the plurality of antenna elements 208 in the selected transmit beam angle 106 of the plurality of different transmit beam angles 108. The plurality of antenna elements 208 define the antenna array 107. The exemplary antenna array 107 in FIG. 2 is shown as being linear, however, the antenna array 107 may be any configuration and the system and method described herein are applicable to any antenna array configuration.

The plurality of antenna elements 208 are mounted on a ground plane 209 of an electrically conductive material or semiconductor material. In accordance with an exemplary embodiment, the ground plane 209 is a plate or panel of a spacecraft, fuselage of an aircraft or other platform associated with a vehicle or fixed geographic location.

In accordance with the exemplary embodiment in FIG. 2, the beam gain angle coding assembly 111 includes a beam gain angle coding module 210 and a beam gain adjustable attenuator 212 in each transmitter signal path 206 of the plurality of transmitter signal paths 206. The beam gain angle coding module 210 is electrically connected to the beam gain adjustable attenuator 212 in each transmitter signal path 206 for modulating the gain of an RF signal portion 214 in each transmitter signal path 206 to produce the resulting gain profile 112 (FIG. 1) of the signal beam 104. Each beam gain adjustable attenuator 212 is separately connected to the beam gain angle coding module 210 which simultaneously modulates all of the gain adjustable attenuators 212 in a synchronous fashion. In accordance with an embodiment, the beam gain angle coding assembly 111 is a component of the phased array RF transmitter 200. In another embodiment, the beam gain angle coding module 210 may be a separate component from the phased array RF transmitter 200 while a beam gain adjustable attenuator 212 is a component of each transmitter signal path 206.

The system 100 or phased array RF transmitter 200 also includes a beam amplitude control module 216 and a beam phase control module 218. Each transmitter signal path 206 includes a beam amplitude adjustable attenuator 220 and an adjustable phase shifter 222. The beam amplitude control module 216 is electrically connected to the beam amplitude adjustable attenuator 220 in each transmitter signal path 206. In accordance with an embodiment, each beam amplitude adjustable attenuator 220 is separately connected to the beam amplitude control module 216 which controls the beam amplitude adjustable attenuators 220 synchronously. The beam phase control module 218 is electrically connected to the adjustable phase shifter 222 in each transmitter signal path 206. In accordance with an embodiment, each adjustable phase shifter 222 is separately connected to the beam phase control module 218 which controls the adjustable phase shifters 222 synchronously. The beam amplitude control module 216 controls an amplitude of the RF signal portion 214 in each transmitter signal path 206 and the beam phase control module 218 controls a phase of the RF signal portion 214 in each transmitter signal path 206 for transmitting the signal beam 104 from the plurality of antenna elements 208 at the selected transmit beam angle 106.

The amplitude of each RF signal portion 214 is further modulated by the beam gain adjustable attenuators 212 in each transmitter signal path 206 to provide a different transmit beam waveform that varies over time for each antenna element 208 to encode the offset angle in the resulting gain profile 114 or angle coded waveform of the signal beam 104. These different transmit beam waveforms can be designed in different ways, for example, ranging from purely random sequences to special communications code sets. However, the different transmit beam waveforms need to be designed or formed so that the resulting gain profile 112, corresponding to different offset angles from the antenna bore sight, are modulated in such a way that the first receiver 120 can determine from the received waveform which offset angle is received. As previously discussed, the received signal beam 104 is cross-correlated against possible received waveforms or possible angle coded waveforms 124, one for each angle offset. For the best performance, the transmit beam waveforms are designed to have good cross-correlation properties to meet the highest performance. Further, as part of the design process, the transmit beam waveforms have a symbol period P, a repetition interval R, an amplitude A, modulation symbol set $\{S_i\}$ (S-sub-i) and symbol sequence $\{s_j\}$ (s-sub-j). These parameter are chosen to meet particular system requirements. Because these parameters are interrelated, they are taken into account during the design process of the system 100. The repetition interval R determines how fast an update rate in beam offset angle can be sustained by the system design. The symbol period P determines the frequency bandwidth of the coded signal beam 104. Also, R/P determines the correlation length, which controls the coding gain and determines the complexity of the correlator 122 or correlation circuitry or software. The amplitude A determines how much affect this angle coding has on the main beam, side lobes and information content and is designed depending on the noise levels of the received signal, including any contribution by an analog-to-digital converter (ADC), in order to reliably determine the correct angle offset. The modulation symbol set $S_i$ (S-sub-i) and symbol sequence Ij (I-sub-j) where $\{S_i\}_{i=1}^{Ns}$ and $\{I_j\}_{j=1}^{NI}$ and where $N_f$=R/P helps determine the coding gain (and hence the reliability of the received signal coding) and are chosen based on communications theory considerations and angle encoding and decoding complexity.

Figure 3:
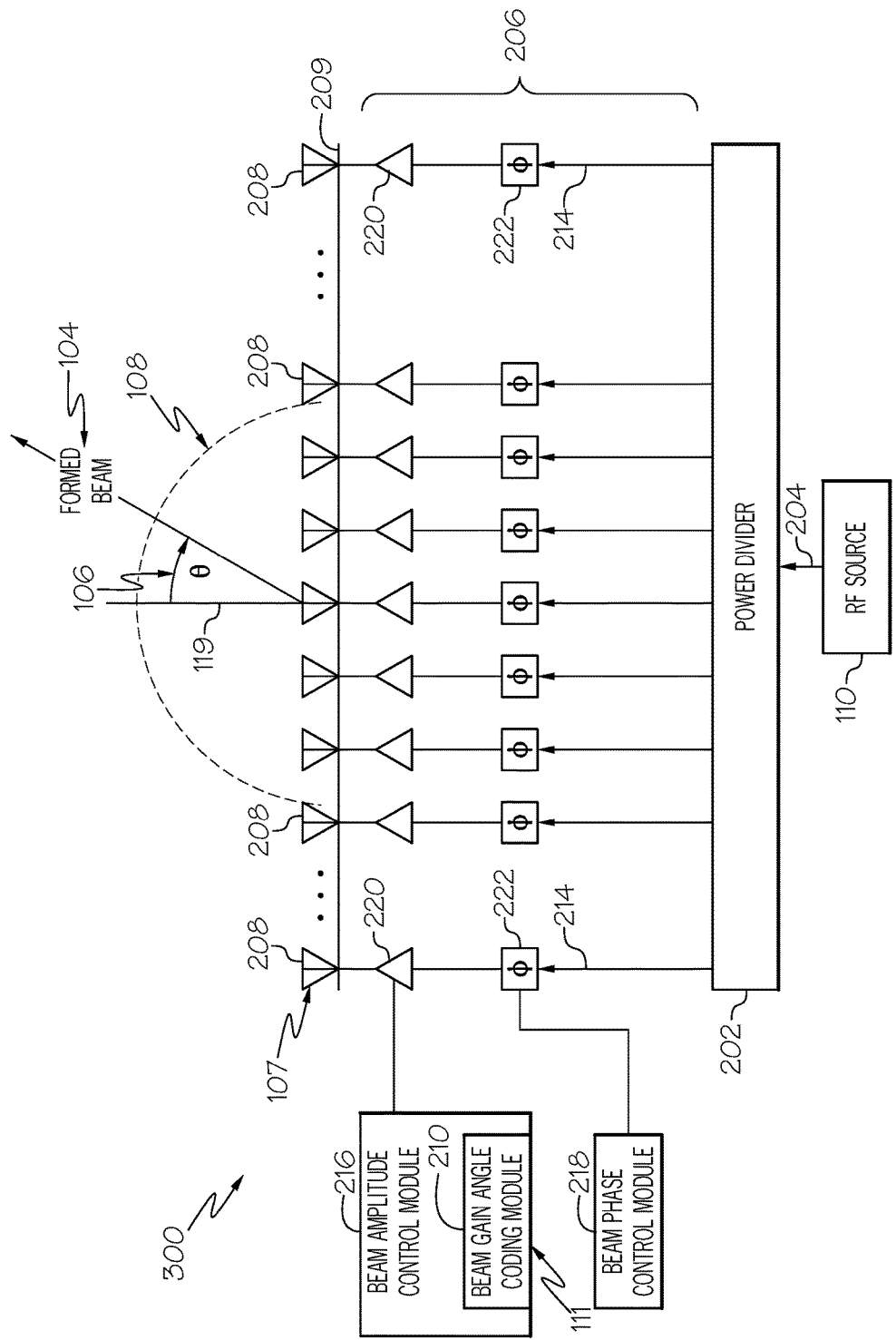
FIG. 3 is a block schematic diagram of an example of phased array transmitter for phased array beam tracking using beam gain coding in accordance with another embodiment of the present disclosure.

Referring to FIG. 3, FIG. 3 is a block schematic diagram of an example of phased array RF transmitter 300 for phased array beam tracking using beam gain coding in accordance with another embodiment of the present disclosure. In accordance with an exemplary embodiment, the phased array RF transmitter 300 is used for the phased array transmitter 102 in FIG. 1. The phased array RF transmitter 300 is similar to the phased array RF transmitter 200 in FIG. 2 except the beam gain angle coding module 210 is incorporated into the beam amplitude control module 216 for modulating the gain of the RF signal portion 214 in each transmitter signal path 206 to produce the resulting gain profile 112 of the signal beam 104. In the exemplary embodiment in FIG. 3, the beam amplitude adjustable attenuator 220 in each transmitter signal path 206 is also configured to perform the function of the beam gain adjustable attenuator 212 of FIG. 2 in each transmitter signal path 206 thus eliminating the beam gain adjustable attenuator 212 in each transmitter signal path 206.

Figure 4:
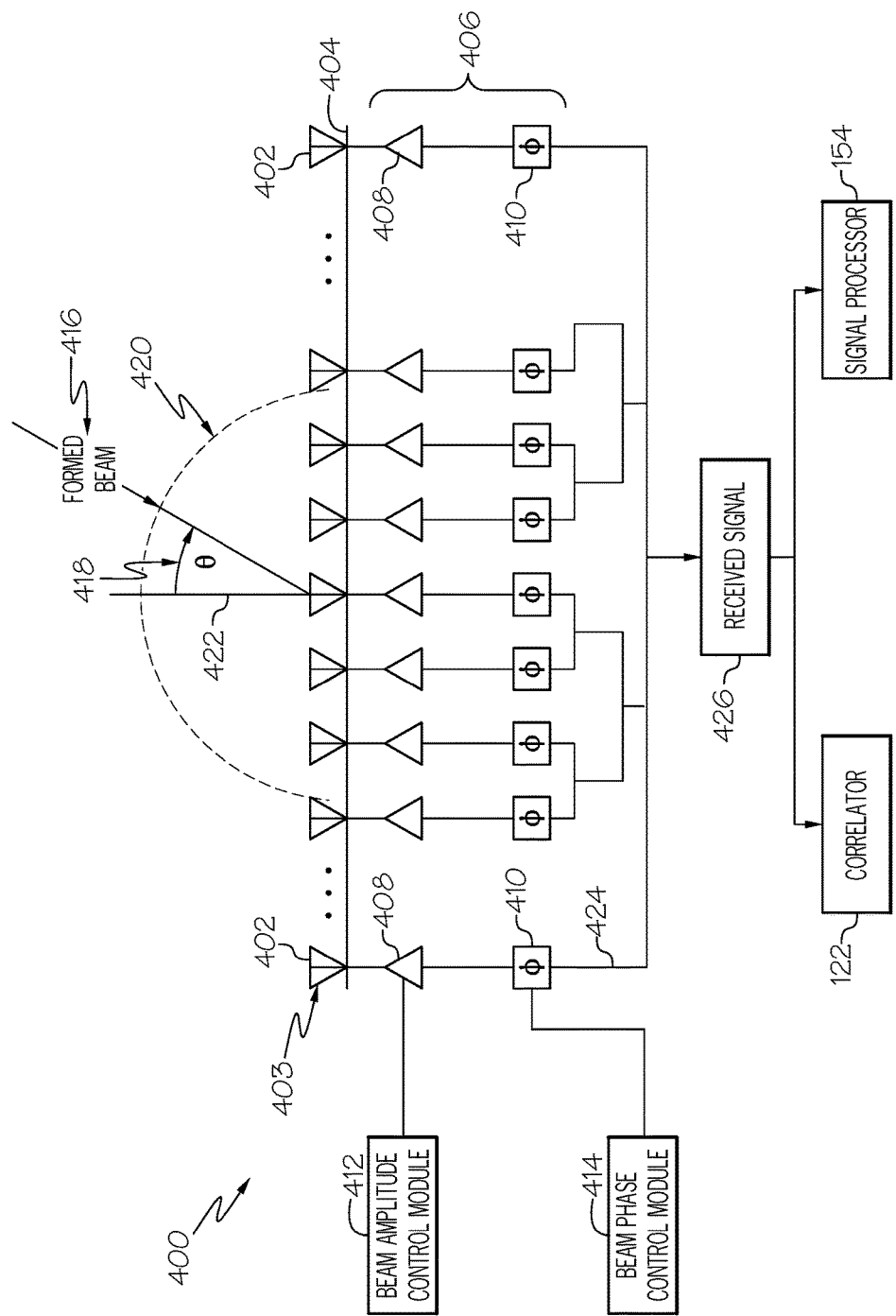
FIG. 4 is a block schematic diagram of an example of a phased array receiver for phased array beam tracking using beam gain coding in accordance with an embodiment of the present disclosure.

FIG. 4 is a block schematic diagram of an example of a phased array receiver 400 for phased array beam tracking using beam gain coding in accordance with an embodiment of the present disclosure. In accordance with an exemplary embodiment, the phased array receiver 400 is used for the first receiver 120 in FIG. 1. The phased array receiver 400 is also used for the second receiver 142 in some exemplary embodiments. The phased array receiver 400 includes a plurality of antenna elements 402. The plurality of antenna elements 402 define an antenna array 403 or a phased array. The exemplary antenna array in FIG. 4 is shown as being linear although any antenna array is applicable. As previously described, in other embodiment, an antenna or antenna system other than an antenna array is used. The plurality of antenna elements 402 or antenna array 403 are mounted on a ground plane 404 of an electrically conductive material or semiconductor material. In accordance with an exemplary embodiment, the ground plane 404 is a plate or panel of a spacecraft, fuselage of an aircraft or other platform associated with a vehicle or fixed geographic location.

Each antenna element 402 is communicatively connected to a receive signal path 406. Each receive signal path 406 includes a beam amplitude adjustable attenuator 408 and an adjustable beam phase shifter 410. A beam amplitude control module 412 is electrically connected to each beam amplitude adjustable attenuator 408 and a beam phase control module 414 is electrically connected to each adjustable beam phase shifter 410. The beam phase control module 414 adjusts or programs a phase of each adjustable beam phase shifter 410 and the beam amplitude control module 412 adjusts or programs an amplitude of each beam amplitude adjustable attenuator 408 to form a receive signal beam 416 at a selected angle of incidence 418 of a plurality of angles of incidence 420 illustrated by the semicircular broken line in FIG. 4. Accordingly, the plurality of antenna elements 402 or phased array of antenna elements 402 are steered by at least the beam phase control module 414 and adjustable beam phase shifter 410 in each receive signal path 406 to receive signals in a direction defined by the receive signal beam 416 at the selected angle of incidence 418. The selected angle of incidence 418 is determined relative to a bore sight 422 or a line normal to the ground plane 404 of the phased array of antenna elements 402.

A received signal component 424 in each receive signal path 406 is combined with the received signal components 424 in each of the other signal paths 406 to form a received signal 426. The received signal components 424 may be combined iteratively in respective pairs until all received signal components 424 are combined to provide the received signal 426 or combined received signal from each of the antenna elements 402. The received signal 426 is transmitted to the correlator 122 and the signal processor 154 as described with reference to FIG. 1 above.

Figure 5A:
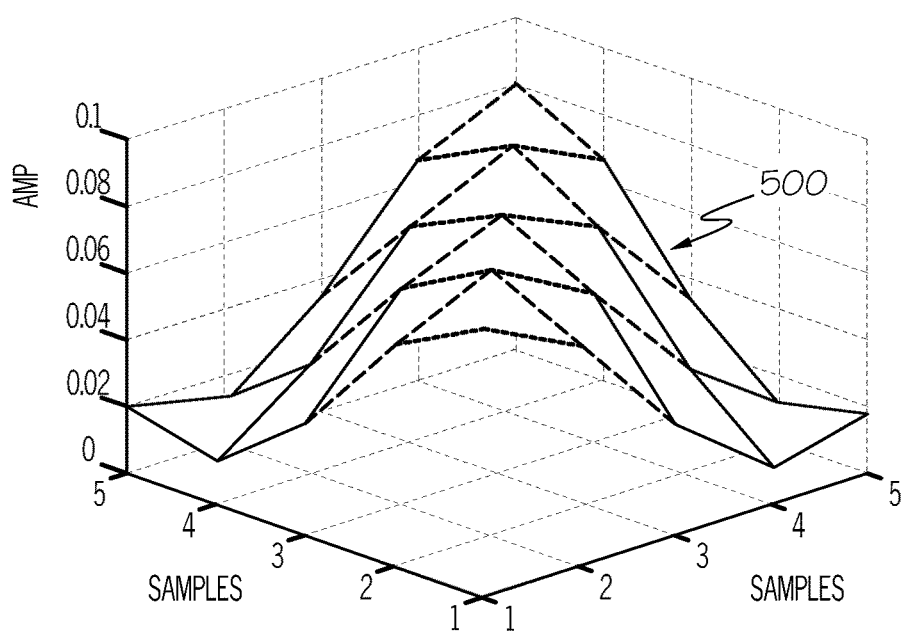
FIG. 5A is an example of cross-correlation of a resulting gain profile or waveform of the received signal beam against a plurality of angle coded waveforms to determine an offset incident angle of the received signal beam in accordance with an embodiment of the present disclosure.
Figure 5B:
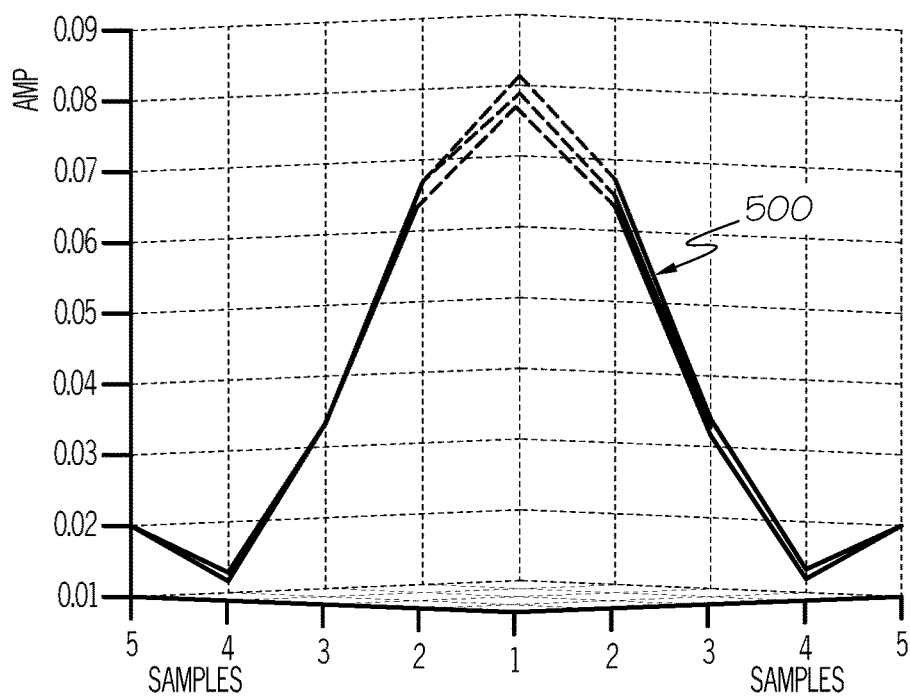
FIG. 5B is a side view of the cross-correlation of the received signal waveform in FIG. 5B.

FIG. 5A is an example of cross-correlation of a resulting gain profile or waveform 500 of the received signal beam against a plurality of angle coded waveforms to determine an offset incident angle of the received signal beam in accordance with an embodiment of the present disclosure. FIG. 5B is a side view of the cross-correlation of the resulting gain profile or waveform 500 of the received signal beam in FIG. 5A. The vertical axis is cross-correlation amplitude and the horizontal axes are cross-correlation samples. As previously described the resulting gain profile 112 (FIG. 1) or waveform of the received signal beam 104, 416 (FIGS. 1 and 4) is cross-correlated against a plurality of angle coded waveforms 124 to determine an offset incident angle 128 of the received signal beam 104, 416. Each angle coded waveform 124 corresponds to a respective one of a plurality of different offset incident angles of an incident signal beam. The offset incident angle 128 of the received signal beam 104, 416 corresponds to an angle coded waveform of the plurality of angle coded waveforms 124 with a highest correlation to the resulting gain profile 112 or waveform of the received signal beam 104, 416. The offset incident angle 128 of the received signal beam 104, 416 is determined in relationship to a bore sight 119, 422 of the receiving antenna 118 or antenna array 403 or a line normal to a ground plane 121, 404 of the receiving antenna 118 or antenna array 403 similar to that illustrated in FIG. 4.

Figure 6:
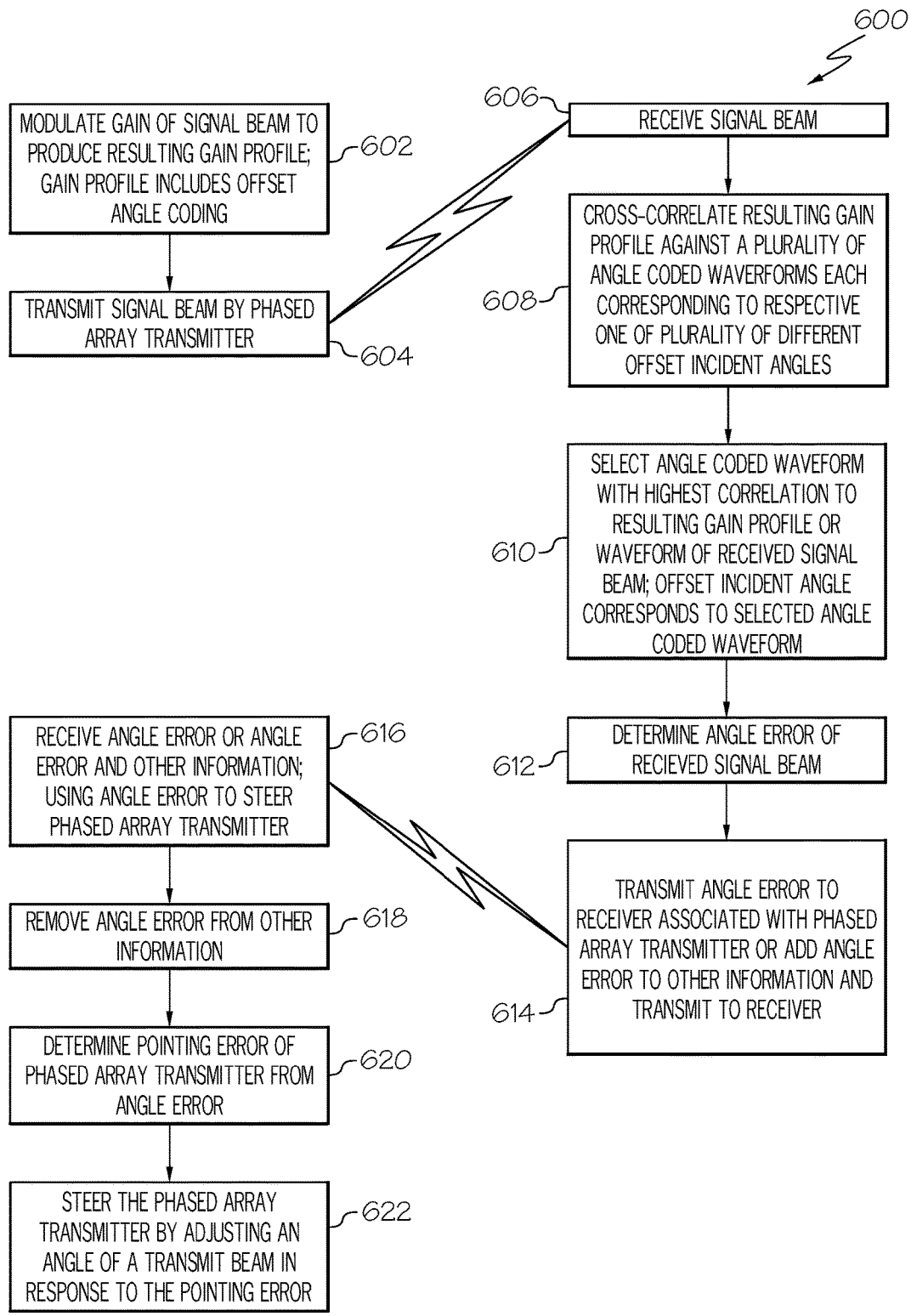
FIG. 6 is a flow chart of an example of a method for phased array beam tracking using beam gain coding in accordance with an embodiment of the present disclosure.

FIG. 6 is a flow chart of an example of a method 600 for phased array beam tracking using beam gain coding in accordance with an embodiment of the present disclosure. In accordance with an embodiment, the method 600 is embodied in and performed by the system 100 in FIG. 1. In block 602, a gain of a signal beam is modulated to produce a resulting gain profile of the signal beam. The resulting gain profile includes offset angle coding that indicates an offset incident angle of the signal beam at a receiving antenna. As previously described, a radio frequency (RF) signal from an RF source is divided into a plurality RF signal portions by a power divider and each RF signal portion is respectively feed to each of a plurality of transmit signal paths in a phased array transmitter, such as phased array RF transmitter 200 in FIG. 2 or phased array RF transmitter 300 in FIG. 3. The gain of the signal beam is modulated by adjusting the gain of the RF signal portion in each transmit signal path of the phased array transmitter.

In block 604, the signal beam is transmitted by the phased array transmitter. The phased array transmitter includes a plurality of antenna elements that each respectively transmit one of the RF single portions in a direction defined by the signal beam. The plurality of antenna elements define a phased array for transmitting the signal beam at a selected transmit beam angle of a plurality of transmit beam angles.

In block 606, the signal beam is received by a first receiver. In accordance with an embodiment, as previously described, the first receiver is phased array receiver including a plurality of antenna elements that define a phased array. In accordance with another embodiment, the first receiver is any type of receiver or antenna and the method described herein is not dependent upon the architecture or type of receiver or antenna.

In block 608, the resulting gain profile or angle coded waveform of the received signal beam is cross-correlated against a plurality of stored angle coded waveforms. Each angle coded waveform corresponds to a respective one of a plurality of different offset incident angles of an incident signal beam. The offset incident angle of the received signal beam corresponds to an angle coded waveform of the plurality of stored angle coded waveforms with a highest correlation to the angle coded waveform of the received signal beam.

In block 610, the angle coded waveform with the highest correlation to the resulting gain profile or waveform of the received signal beam is selected. The offset incident angle of the received signal beam corresponds to the selected angle coded waveform.

In block 612, an angle error of the received signal beam is determined. The angle error is a difference between an actual angle of incidence of the received signal beam and the offset incident angle of the received signal beam determined from the cross-correlation.

In block 614, the angle error is transmitted to a second receiver associated with the phased array transmitter. In accordance with an embodiment, the angle error is added to information that is being transmitted to the second receiver. The angle error added to the information is then transmitted to the second receiver associated with the phased array transmitter.

In block 616, the angle error or the angle error and other information is received by the second receiver. The angle error is then used to steer the phased array transmitter as described with reference to blocks 618-622. In block 618, the angle error is removed or stripped from the other information if the angle error was transmitted with the other information. The angle error is then used to steer the phased array transmitter.

In block 620, a pointing error of the phased array transmitter is determined from the angle error. In block 622, the phased array transmitter is steered by adjusting an angle of a transmit beam in response to the pointing error.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A system for phased array signal beam tracking, comprising:
   a phased array transmitter configurable for transmitting a signal beam at a selected transmit beam angle from a plurality of different transmit beam angles; and
   a beam gain angle coding assembly configured for modulation of a gain of the signal beam to produce a resulting gain profile of the signal beam, the resulting gain profile comprising offset angle coding that indicates an offset incident angle of the signal beam to be received by a receiving antenna, wherein the phased array transmitter is at a different location from the receiving antenna, wherein the resulting gain profile or waveform is cross-correlated against a plurality of angle coded waveforms to determine the offset incident angle at the receiving antenna, the offset incident angle being used to determine an angle error at the receiving antenna which is used to determine a pointing error of the phased array transmitter, and the pointing error being used to steer the selected transmit beam angle.

2. The system of claim 1, further comprising:
   a first receiver to receive the signal beam; and
   a correlator to cross-correlate the resulting gain profile or waveform of the received signal beam against the plurality of angle coded waveforms to determine the offset incident angle of the received signal beam, each angle coded waveform corresponds to a respective one of a plurality of different offset incident angles of an incident signal beam, wherein the offset incident angle of the received signal beam corresponds to an angle coded waveform of the plurality of angle coded waveforms with a highest correlation to the waveform of the received signal beam.

3. The system of claim 2, further comprising:
   a module configured to determine an angle error, wherein the angle error is a difference between an actual angle of incidence of the received signal beam and the offset incident angle of the received signal beam; and
   a transmitter to transmit the angle error to a second receiver associated with the phased array transmitter, the angle error being used to steer the phased array transmitter.

4. The system of claim 3, wherein the angle error is added to information that is being sent by the transmitter to the second receiver.

5. The system of claim 3, further comprising a beam tracking device configured to determine a pointing error of the phased array transmitter from the angle error, wherein the pointing error is used to steer the selected transmit beam angle of the phased array transmitter for tracking the first receiver.

6. The system of claim 1, further comprising a radio frequency (RF) source and wherein the phased array transmitter comprises:
   a power divider that receives an RF signal from the RF source;
   a plurality of transmitter signal paths; and
   a plurality of antenna elements, each transmitter signal path communicatively couples the power divider to an associated antenna element of the plurality of antenna elements, wherein each transmitter signal path is configurable for transmitting the signal beam from the plurality of antenna elements in the selected transmit beam angle of the plurality of different transmit beam angles.

7. The system of claim 6, wherein the beam gain angle coding assembly comprises:
   a beam gain angle coding module; and
   a beam gain adjustable attenuator in each transmitter signal path of the plurality of transmitter signal paths, wherein the beam gain angle coding module is electrically connected to the beam gain adjustable attenuator in each transmitter signal path for modulating the gain of an RF signal portion in each transmitter signal path to produce the resulting gain profile of the signal beam.

8. The system of claim 6, further comprising:
   a beam amplitude control module; and
   a beam phase control module, wherein each transmitter signal path comprises:
   a beam amplitude adjustable attenuator, the beam amplitude control module being electrically connected to the beam amplitude adjustable attenuator in each transmitter signal path; and
   an adjustable phase shifter, the beam phase control module being electrically connected to the adjustable phase shifter in each transmitter signal path, wherein the beam amplitude control module controls an amplitude of an RF signal portion in each transmitter signal path and the beam phase control module controls a phase of the RF signal portion in each transmitter signal path for transmitting the signal beam from the plurality of antenna elements at the selected transmit beam angle.

9. The system of claim 8, wherein the beam gain angle coding assembly comprises a beam gain angle coding module, and wherein the beam gain angle coding module is incorporated into the beam amplitude control module for modulating the gain of the RF signal portion in each transmitter signal path to produce the resulting gain profile of the signal beam.

10. The system of claim 8, wherein the beam gain angle coding assembly comprises a beam gain angle coding module and each transmitter signal path further comprises a beam gain adjustable attenuator, wherein the beam gain angle coding module is electrically connected to the beam gain adjustable attenuator in each transmitter signal path for modulating the gain of the RF signal portion in each transmitter signal path to produce the resulting gain profile of the signal beam.

11. The system of claim 1, wherein the offset angle coding uses one of direct sequence spread spectrum (DSSS) type coding or code division multiple access (CDMA) type coding.

12. The system of claim 1, wherein the offset incident angle of the signal beam is determined in relationship to a bore sight of the receiving antenna or a line normal to a ground plane of the receiving antenna.

13. A system for phased array signal beam tracking, comprising:
   a phased array transmitter onboard a first vehicle, the phased array transmitter being configurable for transmitting a signal beam at a selected transmit beam angle from a plurality of different transmit beam angles;

a beam gain angle coding assembly configured for modulation of a gain of the signal beam to produce a resulting gain profile of the signal beam, the resulting gain profile comprising offset angle coding that indicates an offset incident angle of the signal beam to be received by a receiving antenna;

a first receiver onboard a second vehicle, the first receiver receiving the signal beam at an actual angle of incidence; and a correlator to cross-correlate the resulting gain profile or waveform of the received signal beam against a plurality of angle coded waveforms to determine an offset incident angle of the received signal beam, each angle coded waveform corresponds to a respective one of a plurality of different offset incident angles of an incident signal beam, wherein the offset incident angle of the received signal beam corresponds to an angle coded waveform of the plurality of angle coded waveforms with a highest correlation to the waveform of the received signal beam, and the offset incident angle being used to determine an angle error at the receiving antenna which is used to determine a pointing error of the phased array transmitter, and the pointing error being used to steer the selected transmit beam angle.

14. The system of claim 13, further comprising:
a module configured to determine an angle error, wherein the angle error is a difference between the actual angle of incident of the received signal beam and the offset incident angle of the received signal beam; and
a transmitter to transmit the angle error to a second receiver onboard the first vehicle, the angle error being used to steer the phased array transmitter.

15. The system of claim 13, wherein the phased array transmitter comprises:
a radio frequency (RF) source;
a power divider that receives an RF signal from the RF source;
a plurality of transmitter signal paths; and
a plurality of antenna elements, each transmitter signal path communicatively couples the power divider to an associated antenna element of the plurality of antenna elements, wherein each transmitter signal path is configurable for transmitting the signal beam from the plurality of antenna elements in the selected transmit beam angle of the plurality of different transmit beam angles.

16. The system of claim 15, further comprises:
a beam amplitude control module; and
a beam phase control module, wherein each transmitter signal path comprises:
a beam amplitude adjustable attenuator, the beam amplitude control module being electrically connected to the beam amplitude adjustable attenuator in each transmitter signal path;
an adjustable phase shifter, the beam phase control module being electrically connected to the adjustable phase shifter in each transmitter signal path, wherein the beam amplitude control module controls an amplitude of an RF signal portion in each transmitter signal path and the beam phase control module controls a phase of the RF signal portion in each transmitter signal path for transmitting the signal beam from the plurality of antenna elements at the selected transmit angle; and
a beam gain adjustable attenuator, wherein the beam gain angle coding assembly comprises a beam gain angle coding module, the beam gain angle coding module being electrically connected to the beam gain adjustable attenuator in each transmitter signal path for modulating the gain of the RF signal portion in each transmitter signal path to produce the resulting gain profile of the signal beam.

17. A method for phased array beam tracking, comprising:
modulating a gain of a signal beam to produce a resulting gain profile of the signal beam, the resulting gain profile comprising offset angle coding that indicates an offset incident angle of the signal beam to be received at a receiving antenna;
transmitting the signal beam by a phased array transmitter;
receiving the signal beam by a first receiver; and
cross-correlating the resulting gain profile or waveform of the received signal beam against a plurality of angle coded waveforms, each angle coded waveform corresponds to a respective one of a plurality of different offset incident angles of an incident signal beam, wherein the offset incident angle of the received signal beam corresponds to an angle coded waveform of the plurality of angle coded waveforms with a highest correlation to the waveform of the received signal beam and the offset incident angle being used to determine an angle error at the receiving antenna which is used to determine a pointing error of the phased array transmitter, and the pointing error being used to steer the signal beam.

18. The method of claim 17, further comprising:
determining an angle error of the received signal beam, wherein the angle error is a difference between an actual angle of incidence of the received signal beam and the offset incident angle of the received signal beam; and
transmitting the angle error to a second receiver associated with the phased array transmitter; and
using the angle of error to steer the phased array transmitter.

19. The method of claim 18, wherein transmitting the angle error comprises:
adding the angle error to information that is being transmitted to the second receiver; and
transmitting the angle error with the information to the second receiver.

20. The method of claim 19, further comprising:
removing the angle error from the information;
determining a pointing error of the phased array transmitter from the angle error; and
steering the phased array transmitter by adjusting an angle of a transmit beam in response to the pointing error.

* * * * *